United States Patent [19]
Fischer

[11] Patent Number: 6,012,423
[45] Date of Patent: Jan. 11, 2000

[54] HYPOCYCLOIDAL CRANK MECHANISM FOR PISTON ENGINES, ENGINES ESPECIALLY FOR OPPOSED-CYLINDER INTERNAL COMBUSTION ENGINES

[75] Inventor: Gert Fischer, Feldafing, Germany

[73] Assignee: Bayerische Motoren Werke Aktiengesellschaft, Munich, Germany

[21] Appl. No.: 08/913,385

[22] PCT Filed: Mar. 1, 1996

[86] PCT No.: PCT/EP96/00861

§ 371 Date: Nov. 20, 1997

§ 102(e) Date: Nov. 20, 1997

[87] PCT Pub. No.: WO96/28669

PCT Pub. Date: Sep. 19, 1996

[30] Foreign Application Priority Data

Mar. 14, 1995 [DE] Germany ............................ 195 09 155

[51] Int. Cl.[7] ............................... F16H 21/36; F01B 1/08
[52] U.S. Cl. ......................................................... 123/197.4
[58] Field of Search ............................. 123/197.3, 197.4, 123/197.1, 192.1

[56] References Cited

U.S. PATENT DOCUMENTS 3,285,503   11/1966   Bancroft .
3,791,227    2/1974   Cherry .
5,727,513    3/1998   Fischer ................. 123/197.4

FOREIGN PATENT DOCUMENTS 271755       2/1912   Germany .
25 19 908   11/1976   Germany .
41 08 311 A1  9/1992   Germany .
1 060 372    2/1964   United Kingdom .
2 246 411    1/1992   United Kingdom .
92/17694    10/1992   WIPO .

*Primary Examiner*—Marguerite McMahon
*Attorney, Agent, or Firm*—Evenson, McKeown, Edwards & Lenahan, P.L.L.C.

[57] ABSTRACT

For a hypocycloidal crank mechanism for piston engines, particularly for internal-combustion engines with opposed cylinder banks, which, in a rotationally movable manner arranged on a crank pin of a crankshaft, comprises two lifting eccentrics for the oscillating control of two piston rods and one guiding eccentric arranged between the lifting eccentrics, for the rotationally movable engagement into a straight-guiding element of an orthogonal straight-line mechanism, for increasing the loadability of this crank mechanism, it is suggested that the three eccentrics form a one-piece component with at least one connection shoulder which is provided between a lifting eccentric and the adjacent guiding eccentric and which has such a dimension in the crank pin direction that the guiding element with the circumferentially closed opening guided over the shoulder-side lifting eccentric can be displaced in the area of the connection shoulder transversely to the guiding eccentric for the rotationally movable positioning of the guiding element on the guiding eccentric.

20 Claims, 3 Drawing Sheets

HYPOCYCLOIDAL CRANK MECHANISM FOR PISTON ENGINES, ENGINES ESPECIALLY FOR OPPOSED-CYLINDER INTERNAL COMBUSTION ENGINES

The invention relates to a hypocycloidal crank mechanism for piston engines.

For an internal-combustion engine with diametrically arranged cylinder pairs, such crank mechanisms was suggested in German Patent Application 195 04 890.3 in which, for the highest possible simplification of the hypocycloidal crank mechanism or of the lift engine, for two piston rods, which oscillate in the same direction in a plane and carry pistons on both ends, a single, orthogonally directed straight-line mechanism is provided between these piston rods. This straight-line mechanism comprises a single guiding eccentric arranged between piston-rod-side lifting eccentrics, which guiding eccentric interacts with a straight-line guiding element which is guided on the engine compartment side.

According to a first embodiment of the straight-line mechanism, a Watts-type control arm is provided as a guiding element which has a connecting rod which is constructed in one piece and, in whose bearing opening closed on the circumference, a guiding eccentric is arranged which is constructed of axial bisected sections. In another embodiment of the straight-line mechanism, a sliding block is provided as a guiding element which is bisected in the plane of the axis of the bearing opening and which interacts with a one-piece guiding eccentric connected in one piece with compensating masses. In the case of both embodiments, the multi-part combination, which in each case consists of three eccentrics, must be combined to a constructional unit by means of additional elements.

It is an object of the invention to improve the hypocycloidal crank mechanism of the above-mentioned type such that a built-up 3-eccentric combination is avoided and a respective straight-line guiding element can nevertheless be arranged with a circumferentially closed bearing opening on the guiding eccentric.

This object is achieved according to the present invention, specifically such that the three eccentrics form a one-piece component with at least one connection shoulder provided between a lifting eccentric and the adjacent guiding eccentric, which connection shoulder extends such in the crank pin direction that the guiding element with the circumferentially closed bearing opening guided over the shoulder-side lifting eccentric, can be displaced in the area of the connection shoulder transversely toward the guiding eccentric, for the rotationally movable positioning of the guiding element on the guiding eccentric.

The advantage of the invention is a one-piece 3-eccentric combination of a particularly high stability and operational reliability, paired with a straight-line guiding element which has a circumferentially closed opening and can be highly stressed, the pairing of the crank mechanism parts being distinguished by a simple mounting with a first straight-line movement over a lifting eccentric, a subsequent transverse movement in the area of the connection shoulder to the guiding eccentric and finally a further straight-line movement in the direction of the guiding eccentric, whereby the straight-line guiding element is threaded onto it. For further facilitating the mounting, the diameter of each lift eccentric is no more than equal; however, preferably smaller than the diameter of the guiding eccentric.

In the case of a single connection shoulder, which has a correspondingly long design, between a lift eccentric and the guiding eccentric, the invention permits the arrangement of straight-line guiding elements constructed in one piece, as, for example, the connecting rod of a Watts-type control arm, of a sliding block or of a roller bearing with an outer race used for the guiding.

For achieving a symmetrical loading of the crank mechanism, in an advantageous embodiment of the invention, the guiding eccentric is in a one-piece connection with each lifting eccentric by way of a connection shoulder, according to the invention, the guiding element consisting of parts which are dimensioned to be adapted to the courses of the connection shoulders and are divided transversely to the axis of the bearing opening.

The above-described construction of the one-piece 3-eccentric component according to the invention, including the connection shoulders designed according to the invention, can advantageously be designed to be free of undercuts so that a lowcost manufacturing of the 3-eccentric component as a heavy-metal casting, a nonferrous-metal casting or a light-metal casting or as a sintered part can advantageously be achieved which is adapted to the respective load.

The above-described division of the guiding element according to the invention transversely to the circumferentially closed bearing opening for the guiding eccentric can particularly advantageously be applied to a connecting rod of a Watts-type control arm. Instead of providing the connecting rod with a massive construction, while taking into account real loads, this connecting rod may be constructed of two relatively thin-walled and therefore particularly light parts, in which case these parts obtain their required stability from a shell-type design.

Preferably, the connecting rod designed in two parts is formed of identical parts, in which case a second part is obtained by folding a first part about a body axis. This identical-part design of parts produced by means of a single tool, results in an advantageous manufacturing as a sheet metal pressing. However, a construction as a high-quality casting or as a light metal diecast part or as a sintered part is also conceivable.

With respect to a Watts-type control arm in a hypocycloidal crank mechanism with a massively constructed connecting rod, it is known to dispose the swing arms in fork-type end sections of the connecting rod. In the case of a connecting rod constructed of two equal parts, while the above-described type of linking the swing arms is maintained, the connecting rod parts may be axially spaced, whereby their dimensions are smaller in the direction of the crank pin in comparison to a bisected construction, and correspondingly in an advantageous manner the connection shoulders are of a correspondingly shorter dimension. On the one hand, this leads to a bending-resistant 3-eccentric component and, on the other hand, results in a freer selection of cylinders spaced in parallel next to one another. The axial distance of two connecting rod parts can preferably be determined by way of a surrounding collar on the outer circumference of a two-part slide bearing half-liner arranged between the guiding eccentric and the guiding bearing lugs of the connecting rod parts. For securing the axial distance, the arrangement of the connecting rod parts on the slide bearing half-liner by way of the guiding bearings lugs by means of a press fit is also helpful, in which case bearing pins arranged in the linking bushes of the connecting rod parts particularly have the purpose of a rotationally securing the connecting rod parts relative to one another.

In addition to interacting with a common slide bearing half-liner, the connecting rod parts can rotationally movably also interact by way of separate slide bearing rings with the guiding eccentric. In addition, a common roller bearing for both connecting rod parts is conceivable, but also a separate roller bearing for each connecting rod part.

The invention will be described by means of an embodiment illustrated in the drawing.

Figure 1:
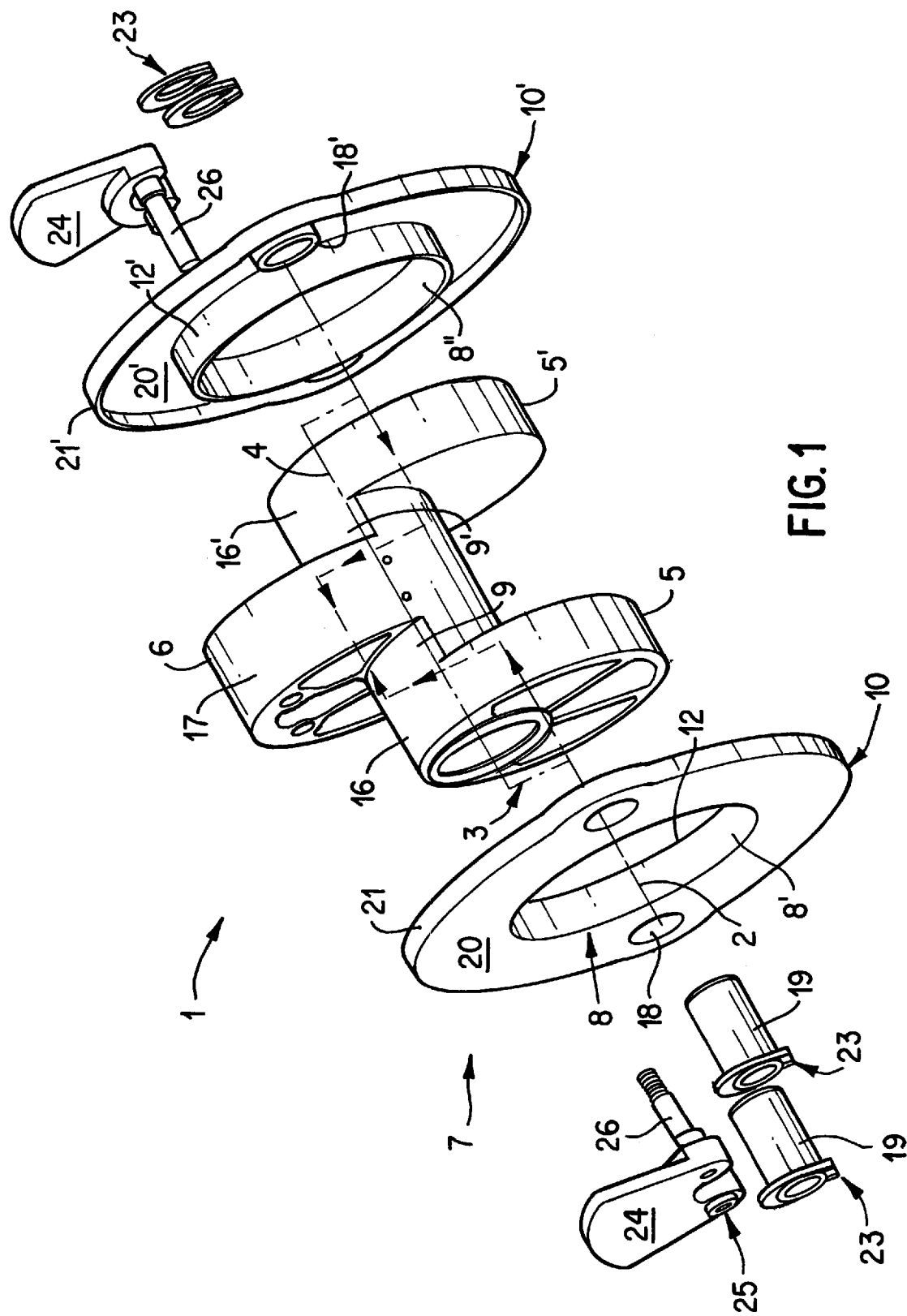
FIG. 1 is an exploded view of the part of a hypocycloidal crank mechanism of a piston internal-combustion engine constructed according to the invention.

In a hypocycloidal crank mechanism 1 of a piston internal-combustion engine which is not shown and which has opposed cylinder banks whose cylinders arranged in pairs are directed with their axes orthogonally to the crank-shaft axis 2, reference number 3 indicates a crankshaft which is only illustrated by a continuous line.

On the crank pin of the crankshaft 3 illustrated by a continuous line 4, three eccentrics 5, 5' and 6 are arranged in a rotationally movable manner, with one guiding eccentric 6 and two lifting eccentrics 5, 5' which are diametrically aligned to the guiding eccentric 6, for piston rods (not shown) which are controlled to be oscillating in the same direction. The guiding eccentric 6 interacts with a straight-line guiding element 7 of a straight-line mechanism which is orthogonal to the lifting direction of the piston rods, the straight-line guiding element 7 receiving the guiding eccentric 6 in a bearing opening 8.

According to the invention, the lifting eccentrics 5 and 5' and the guiding eccentric 6 form a one-piece component provided that one connection shoulder 9, 9' respectively is disposed between each lifting eccentric 5, 5' and the adjacent guiding eccentric 6, which connection shoulder 9, 9' has in each case such a dimension (i.e., width) in the crank pin direction that parts 10, 10' of the straight-line guiding elements 7 divided transversely to the axis of the bearing opening 8 can be arranged with a respective circumferentially closed opening 8', 8" on the guiding eccentric 6. As illustrated by arrows shown particularly in FIG. 1, each guiding element part 10, 10', guided over the respective crank pin 5, 5', is displaced into the area of the respective connection shoulders 9, 9' and in this area then transversely toward the guiding eccentric 6 until the respective opening 8', 8" is aligned with the guiding eccentric 6 for the subsequent positioning of each part 10, 10' on the guiding eccentric 6.

In the case of essentially equally large diameters of the eccentrics 5, 5' and 6, for facilitating the mounting of the straight-line parts 10, 10' in the above-described manner, the respective bearing opening 8', 8" is selected to have a larger diameter, for example, by the dimensions of a bisected bearing half-lining 11 (FIG. 2) between the guiding eccentric 6 and the guiding bearing lugs 12, 12' of the parts 10, 10' bounding the openings 8', 8". It is also possible to select the diameters of the lifting eccentrics 5, 5' to be smaller than that of the guiding eccentric 6.

As also illustrated in FIG. 1, the one-piece 3-eccentric component according to the invention, for the central arrangement of the guiding eccentric 6 between the two lifting eccentrics 5, 5', for the uniform loading of the only partially shown hypocycloidal crank mechanism 1, has connection shoulders 9, 9' of the same length. In a combination of this crank mechanism 1 with a Watts-type control arm 13, its connecting rod 15, which is guided in a straight line by way of swing arms 14 and is formed of parts 10, 10', forms the straight-line guiding element 7. By means of constructing the connecting rod 15 of two parts 10, 10' axially spaced on the guiding eccentric 6, the advantageous linking of the swing arms 14 between these parts 10, 10' is obtained. This axially spaced arrangement of the connecting rod parts 10, 10' permits in a further advantageous manner to select its smaller dimensions in the direction of the guiding eccentric 6, which has the additional advantage of relatively short connection shoulders 9, 9'.

Short connection shoulders 9, 9' result in a particularly stiff one-piece 3-eccentric constructional unit, the cross-section and the surface design of the connection shoulders 9, 9' further contributing to the stiffness in that, on the guiding eccentric side, these are bounded by corresponding cylindrical surface areas of the slide bearings 16 of the lifting eccentrics 5, 5' and, on the lifting eccentric side, are bounded by a corresponding cylindrical surface area of the slide bearing 17 of the guiding eccentric 6.

As also illustrated in FIG. 1, the one-piece 3-eccentric component is free of undercuts, which permits an advantageous construction as a casting corresponding to the loading of the crank mechanism 1 made of a heavy metal, of a non-ferrous metal or of a light metal. A construction as a sintered part also seems advantageous.

A high stiffness of the one-piece 3-eccentric component, in connection with connecting rod parts 10, 10' with circumferentially closed openings 8', 8", results in a high loadability of the hypocycloidal crank mechanism 1. These circumferentially closed bearing openings 8', 8" permit that each connecting rod part 10, 10', in a thin-walled development, comprises a supporting wall 20, 20' which, preferably in one piece, connects the guiding bearing lugs 12, 12' and two diametrically arranged linking bushes 18, 18' respectively for the bearing pins 19 of the swinging arms 14, which supporting wall 20, 20', along its circumferential contour, has a reinforcing edge 21, 21' which is preferably arranged in one piece. This shell-type construction is suitable for constructing each connecting rod part 10, 10' as a sheet metal pressing or as a high-quality casting or as a light-metal diecast part or as a sintered part. By means of the symmetrical arrangement of the connecting rod parts 10, 10' on the guiding eccentric 6, in conjunction with the identical coordination of the form and the dimensions, the advantage is obtained that, for the two-piece connecting rod 15 of the Watts-type control arm 13, the parts 10 and 10' can be manufactured from a single tool and therefore the advantage of an identical-part construction is achieved.

For avoiding a high-expenditure securing of the axial spacing of both connecting rod parts 10, 10' on the guiding eccentric 6, the slide bearing half-lining 11 engaging in the guiding bearing lugs 12, 12' is constructed on the outer circumference with a surrounding collar 22 as a stop for the connecting rod parts 10, 10'. The axial securing is further supported by the fact that, on the two-piece slide bearing half-lining 11 which encloses the guiding eccentric 6, the connecting rod parts 10, 10' are arranged by way of guiding bearing lugs 12, 12' by means of a press fit. Finally the fixing devices 23 provided in the end sections of the bearing pins 19 are used for the axial securing of the connecting rod parts 10, 10' in the direction of the lifting eccentrics 5, 5'. By means of the bearing pins 19, which in each case penetrate diametrical linking bushes 18, 18' of the connecting rod parts 10, 10' and which are used for the connecting-rod-side linking of the swinging arms 14, in the case of a slight press fit of the parts 10, 10' on the slide bearing half-lining 11, a securing is also achieved with respect to a relative rotating of the connecting rod parts 10, 10'.

As also illustrated in the figures, mutually opposite compensating weights 24, 24' are detachably arranged on the guiding eccentric 6, in which case the compensating weights 24, 24' are axially spaced in sections from the supporting wall 20, 20' of each connecting rod part 10, 10' such that the compensating weights 24, 24' rotate freely past securing/holding devices or fixing devices 23 of the bearing pins 19 which project beyond the supporting walls 20, 20'. In addition, the compensating weights 24, 24' each have an internal screw thread 25, 25' and are also equipped with one stud 26, 26' respectively.

Figure 2:
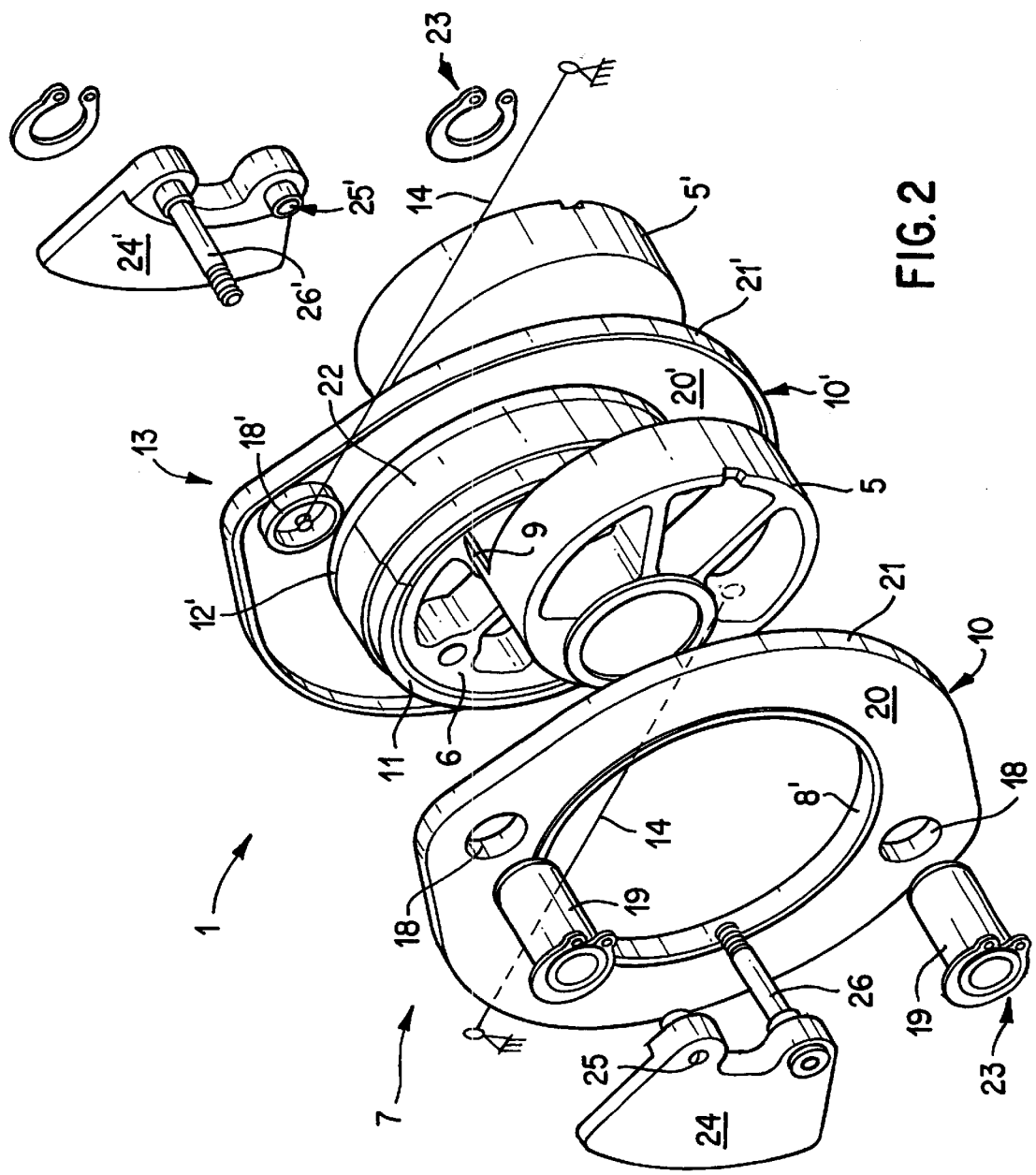
FIG. 2 is a perspective exploded view of the part of the crank mechanism according to FIG. 1 in a partially mounted condition.
Figure 3:
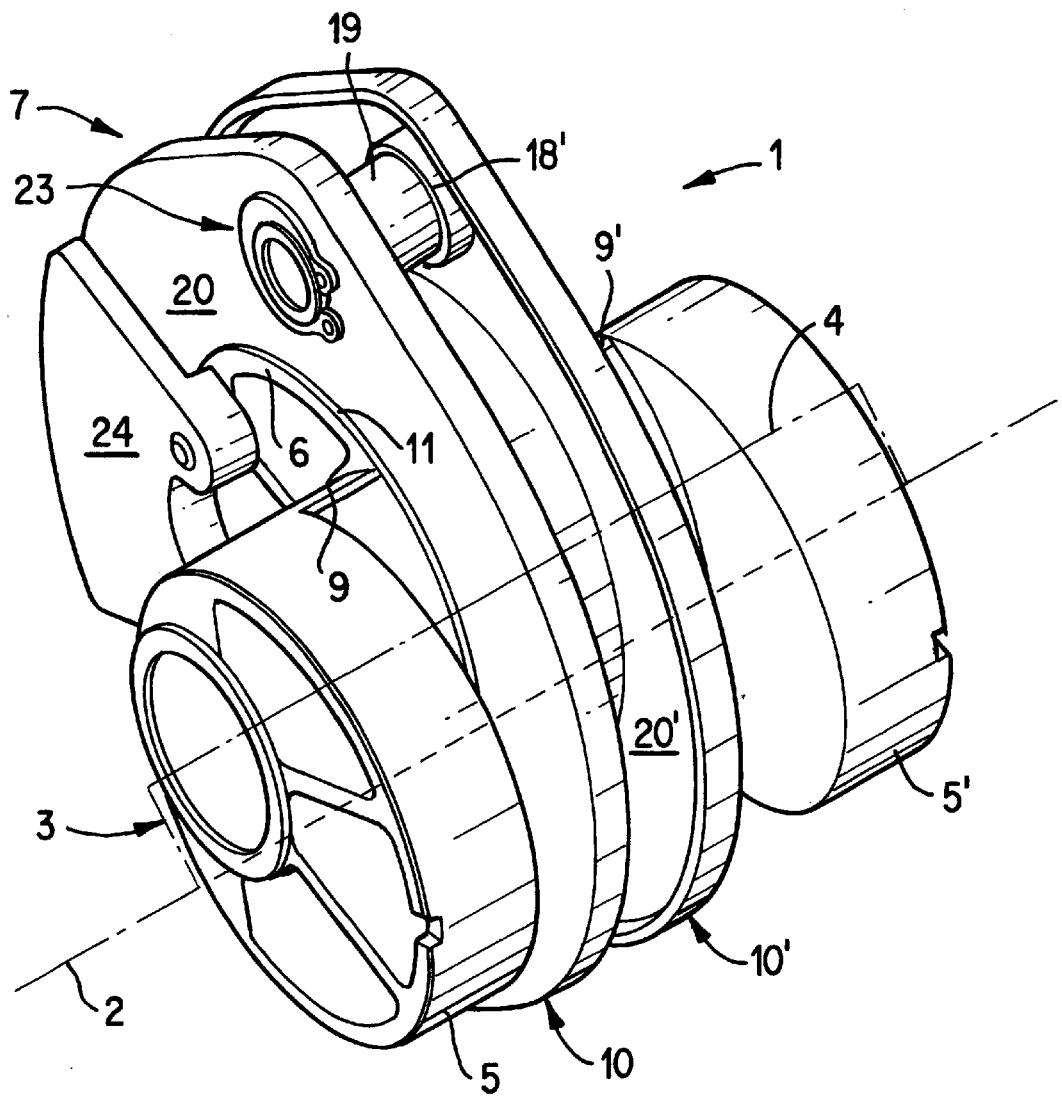
FIG. 3 is a perspective view of the crank mechanism part in a completely mounted condition.

Within the scope of the invention, the parts of the connecting rod 15 not illustrated in FIGS. 1 to 3 can flushly strike on the guiding eccentric 6 with mutually facing bearing lugs, one sliding or roller bearing being provided in each bearing lug.

In the case of a one-piece 3-eccentric constructional unit according to the invention with two connection shoulders on both sides of the guiding eccentric, a sliding block is also conceivable which is divided transversely to the axis of its bearing opening. Instead of the sliding block, in the case of such a three-eccentric unit, two roller bearings may be provided whose outer bearing races are used as the straight-line mechanism.

However, the one-piece 3-eccentric constructional unit according to the invention can also be constructed with only one connection shoulder between the guiding eccentric and one of the lifting eccentrics, whereby the arrangement of a one-piece connecting rod of a Watts-type control arm or the arrangement of a one-piece sliding block or the arrangement of a wide roller bearing is conceivable.

I claim:

1. Hypocycloidal crank mechanism for piston engines, comprising:

three eccentrics which are rotationally movably arranged on a crank pin of crankshaft, said three eccentrics including a guiding eccentric and two lifting eccentrics which are diametrically aligned relative to the guiding eccentric, said eccentrics being for piston/guiding rods which are controlled to oscillate in the same direction, the guiding eccentric being rotationally movably disposed in an opening of a straight guiding element of a straight-line mechanism which is orthogonal to the lifting direction of the piston/guiding rods, the three eccentrics forming a one-piece component with at least one connection shoulder provided between a lifting eccentric and the adjacent guiding eccentric, of such a dimension in the crank pin direction that the straight guiding element, with the circumferentially closed opening guided over the shoulder-side lifting eccentric can be displaced in the area of the connection shoulder transversely toward the guiding eccentric, for the rotationally movable positioning of the guiding element on the guiding eccentric, wherein the one-piece 3-eccentric component is constructed to be free of undercuts for a heavy-metal casting, a non-ferrous metal casing, a light-metal casting or a sintered part.

2. Hypocycloidal crank mechanism for piston engines, comprising:

three eccentrics which are rotationally movably arranged on a crank pin of crankshaft, said three eccentrics including a guiding eccentric and two lifting eccentrics which are diametrically aligned relative to the guiding eccentric, said eccentrics being for piston/guiding rods which are controlled to oscillate in the same direction, the guiding eccentric being rotationally movably disposed in an opening of a straight guiding element of a straight-line mechanism which is orthogonal to the lifting direction of the piston/guiding rods, the three eccentrics forming a one-piece component with at least one connection shoulder provided between a lifting eccentric and the adjacent guiding eccentric of such a dimension in the crank pin direction that the straight guiding element, with the circumferentially closed opening guided over the shoulder-side lifting eccentric can be displaced in the area of the connection shoulder transversely toward the guiding eccentric, for the rotationally movable positioning of the guiding element on the guiding eccentric, wherein a connecting rod of a Watts-type control arm is used as the straight guiding element, and wherein the connecting rod comprises two parts which are separated vertically with respect to the axis of the bearing opening, with an opening which is in each case closed circumferentially.

3. Crank mechanism according to claim 2, wherein the guiding eccentric is in a one-piece connection with each lifting eccentric via the connection shoulder, and wherein the straight guiding element comprises parts which are dimensioned to be adapted to the courses of the connection shoulders and are divided transversely to the axis of the bearing opening.

4. Crank mechanism according to claim 2, wherein the diameter of each lifting eccentric is equal to or smaller than the diameter of the guiding eccentric.

5. Crank mechanism according to claim 2, wherein the connection shoulders of the one-piece 3-eccentric component are bounded on the guiding eccentric side by corresponding cylindrical lateral surfaces of the lifting eccentrics and are bounded on the lifting eccentric side by a corresponding cylindrical lateral surface of the guiding eccentric.

6. Crank mechanism according to claim 2, wherein in a thin-walled further development, each connecting rod part has a supporting wall which connects a guiding bearing lug and two diametrically arranged linking bushes for bearing pins of swinging arms of the Watts-type control arm, which supporting wall has a reinforcing edge along its circumferential contour.

7. Crank mechanism according to claim 2, wherein the two-piece connecting rod is formed of identical parts, and each identical part is constructed as a sheet metal pressing or as a high-quality casting or as a light-metal diecast part or as a sintered part.

8. Crank mechanism according to claim 2, wherein the parts of the connecting rod are arranged in an axially spaced manner on the guiding eccentric, and this axial distance between the connecting rod parts is determined by way of a collar extending around on the outer circumference of a bisected slide bearing half-lining.

9. Crank mechanism according to claim 8, wherein, on the slide bearing half-lining surrounding the guiding eccentric, the connecting rod parts are arranged by means of a press fit by way of the guiding bearing lugs, and wherein the connecting rod parts are rotationally secured particularly relative to one another by way of the bearing pins 19 arranged in the linking bushes.

10. Crank mechanism according to claim 6, wherein compensating weights, which can be connected with the guiding eccentric, are axially spaced away from the supporting wall of each connecting rod part such that the compensating weights rotate freely past securing/holding devices of the bearing pins which project beyond the supporting walls.

11. Crank mechanism according to claim 10, wherein the compensating weights which are arranged opposite one another on the guiding eccentric each have a screwing thread and are equipped with a stud.

12. Crank mechanism according to claim 2, wherein the parts of the connecting rod on the guiding eccentric come to a flush stop by means of mutually facing guiding bearing lugs, and wherein a slide or a roller bearing is provided in each bearing lug.

13. Crank mechanism according to claim 2, wherein a one-piece sliding block or a sliding block which is divided transversely with respect to the axis of the bearing opening is used as the straight guiding element.

14. Crank mechanism according to claim 2, wherein one or several roller bearings arranged on the guiding eccentric are used as the straight guiding element.

15. A hypocycloidal crank mechanism for a piston engine having a crankshaft and two piston-guiding rods, comprising:
- a one-piece three-eccentric component to be disposed on a crankpin of said crankshaft defining an axial direction,
- said one-piece three-eccentric component including one central guiding eccentric and two lifting eccentrics arranged on opposite axial sides of said guiding eccentric,
- at least one of said lifting eccentrics being axially spaced from said guiding eccentric and being connected to said guiding eccentric via a connection shoulder,
- said two lifting eccentrics to be engaged with said two piston-guiding rods, respectively,
- said guiding eccentric to be engaged with a straight-line guiding element,
- said straight-line guiding element including a portion defining a circumferentially closed opening to be disposed around said guiding eccentric,
- said opening being at least as large as a periphery of said at least one of said lifting eccentrics,
- said connection shoulder having a width in said axial direction which is at least as great as a width of said portion of the straight-line guiding element defining the opening.

16. Crank mechanism according to claim 15, wherein said straight-line guiding element comprises two parts which are divided in a plane perpendicular to said axial direction.

17. Crank mechanism according to claim 15, wherein the connection shoulders of the one-piece three-eccentric component are bounded on the guiding eccentric side by corresponding cylindrical lateral surfaces of the lifting eccentrics and are bounded on the lifting eccentric side by a corresponding cylindrical lateral surface of the guiding eccentric.

18. Crank mechanism according to claim 15, wherein the one-piece 3-eccentric component is constructed to be free of undercuts for a heavy-metal casting, a non-ferrous metal casting, a light-metal casting or a sintered part.

19. Crank mechanism according to claim 15, wherein a connecting rod of a Watts-type control arm is used as the straight guiding element, and wherein the connecting rod comprises two parts which are separated vertically with respect to the axis of the bearing opening, with an opening which is in each case closed circumferentially.

20. A method of assembling the hypocycloidal crank mechanism of claim 15, said method comprising:
- aligning said opening essentially coaxially with one of the lifting eccentrics which is connected to said guiding eccentric via said connection shoulder,
- moving at least one of said straight-line guiding element and said one-piece three-eccentric component axially such that said one of the lifting eccentrics passes through said opening and said straight-line guiding element surrounds said connection shoulder,
- moving at least one of said straight-line guiding element and said one-piece three-eccentric component perpendicularly to the axial direction to align said opening essentially coaxially with said guiding eccentric,
- moving at least one of said straight-line guiding element and said one-piece three-eccentric component axially such that said guiding eccentric is disposed inside of said opening.

* * * * *